(12) United States Patent
Skuba

(10) Patent No.: US 6,336,291 B1
(45) Date of Patent: Jan. 8, 2002

(54) METHOD OF GROWING A GARDEN AND PRODUCT PRODUCED THEREBY

(76) Inventor: Jerome Skuba, 1030 W. Melody Rd., Lake Forest, IL (US) 60045

(*) Notice: Subject to any disclaimer, the term of this patent is extended or adjusted under 35 U.S.C. 154(b) by 0 days.

(21) Appl. No.: 09/123,218

(22) Filed: Jul. 27, 1998

(51) Int. Cl.⁷ .................................................. A01G 1/00
(52) U.S. Cl. .......................................... 47/56; 47/58.1
(58) Field of Search ....................... 47/1.01 F, 1.01 R, 47/9, 58.1, 56; 442/5, 13, 26

(56) References Cited

U.S. PATENT DOCUMENTS

| | | | | |
|---|---|---|---|---|
| 2,923,093 A | * | 2/1960 | Allen | 47/56 |
| 3,315,408 A | * | 4/1967 | Fisher | 47/56 |
| 4,318,248 A | * | 3/1982 | Muldner | 47/56 |
| 4,941,282 A | | 7/1990 | Milstein | 47/58 |
| 4,982,526 A | * | 1/1991 | Miyachi | 47/56 |
| 5,189,833 A | * | 3/1993 | Clark | 47/56 |
| 5,205,068 A | * | 4/1993 | Solomou | 47/56 |
| 5,306,317 A | * | 4/1994 | Yoshizaki | 47/58.1 X |
| 5,346,514 A | * | 9/1994 | Molnar et al. | 47/56 X |
| 5,421,123 A | * | 6/1995 | Sakate et al. | 47/56 |
| 5,849,645 A | * | 12/1998 | Lancaster | 442/5 |
| 5,887,382 A | * | 3/1999 | Marshall et al. | 47/56 |
| 5,974,735 A | * | 11/1999 | Behrens | 47/58.1 |
| 6,029,397 A | * | 2/2000 | Motz et al. | 47/58.1 |

FOREIGN PATENT DOCUMENTS

| | | | | |
|---|---|---|---|---|
| DE | 34 00 696 A1 | * | 7/1985 | 47/56 |
| DE | 3816865 A1 | * | 11/1989 | 47/56 |
| WO | WO 85/03842 | * | 9/1985 | 47/56 |

OTHER PUBLICATIONS

North American Green C350 sheet (publication date unknown).

\* cited by examiner

*Primary Examiner*—Peter M. Poon
*Assistant Examiner*—Jeffrey L. Gellner
(74) *Attorney, Agent, or Firm*—Peter K. Trzyna, Esq.

(57) ABSTRACT

An improvement in a method of propagating, and an article useful in association with, or produced by, the method of propagating. Plants are produced in mats by steps including: providing a bottom net made of a material that is pervious to moisture, positioning a sheet of a fabric, depositing a layer of planting medium on said fabric, spreading viable wildflower seed over said medium, moistening said medium and said seeds, germinating seeds in the medium, such that roots of seedlings from said seeds intermesh with the fabric forming a sod mat; wherein the bottom net is sufficiently pervious to permit essentially unimpeded root contact with earth below the bottom net.

26 Claims, 3 Drawing Sheets

METHOD OF GROWING A GARDEN AND PRODUCT PRODUCED THEREBY

BACKGROUND OF THE INVENTION

A. Field of the Invention

The present invention relates to a method of plant husbandry and product produced thereby, as in a composition and article of manufacture. More particularly, the present invention pertains to structures for aiding in manufacturing, transporting, and installing reinforced growing media with plant roots and crowns therein. Even more particularly, the present invention relates to improvements to wildflower sod fabrics, arrays, and layouts.

B. Background of the Invention

Growing, harvesting, transporting, and planting rolls of sod per se is well known. Installation includes using large staples or stakes to secure the sod to the ground, particularly for a slope or swale.

For growing plants other than grasses, such as wildflowers, young root masses are generally not considered strong enough to harvest, transport, and install in the manner of grass sod. Thus, certain kinds of mats and rolls have been used in the seed and plant industry as a convenient device for the transport, storage, and installation of seeds and such seedlings. These kinds of products generally are prepared using a base sheet (of, say, polyester fabric), upon which the propagating medium and seeds are deposited. See, for example, U.S. Pat. No. 4,941,282, titled Wildflower Sod Mat and Method of Propagation." Sometimes a protective upper sheet or veil is positioned over the medium, and occasionally, some form of adhesive is used to bind each layer to the next, i.e., the protective covering to the propagating medium, and the propagating medium to the base sheet. The product of such an approach is something resembling a laminate.

There are a number of drawbacks to such an approach. The laminates are expensive to produce and thus are costly to the consumer; but most importantly, the laminates of the known prior art prevent root crowns from full contact with the earth below the laminates, which in turn directly effects the survivability of the seedlings.

Additionally, the staples and stakes used to secure sod to a slope or a swale do not work because the base sheet interferes with the bonding of the roots to the earth.

Alternatively, humus or mulch has been used as the propagating medium. Humus or mulch expands upon exposure to moisture, thereby breaking down the base sheet material before final installation and planting of the roll or mat. Such expansion, however, also has an additional disadvantage: the seeds and the propagating medium can be washed away from the base sheet material due to the expansion. Stitching to form layers of the protective covering, seeds, medium, and base also proved to have its disadvantages. Stitching tends to inhibit the expansion of the propagating medium, forming an irregular bottom surface and only partial contact with the earth, which again decreases the survival rate of the seedlings.

Base sheets have also been problematic. Some base sheets are completely biodegradable upon wetting, and as a result, the laminates fall apart during attempts at transporting, storing, and installing. Other base sheets are impervious to moisture, such that seed germination is inhibited by poor drainage.

Furthermore, alternative types of base sheets are impervious to root penetration, which prevents meshing of the base sheet with the seedling root mass. Therefore, the base sheet acts as a carrier for the sod, rather than as an integral part thereof.

The advent of a pervious base sheet (e.g., of polyester fabric) has partially solved the problem of integrating the root mass of the seedlings with the base sheet to form a stronger sod mat. A disadvantage of having a pervious barrier formed by the base sheet, however, is that the root crown's of the seedlings are on one side of the barrier and only the roots penetrating the fabric are on the other side so as to ultimately come into contact with the earth. This condition adversely effects the long term survivability of the seedlings sod matrix, by the loss of winter hardiness from exposing the root crowns to the elements—with a general decline in seedling vigor, which eventually results in plant death.

Another disadvantage is that the base sheets (and other such structures) are not biodegradable, so that a subsequent planting requires removal of the base sheet or other such structure.

The laminates have been formed in a container, such as a plastic tray, to produce mats with a homogeneous mixture of seeds (wildflowers). See again, U.S. Pat. No. 4,941,282, titled Wildflower Sod Mat and Method of Propagation." But the use of trays is not helpful for large commercial applications.

For such commercial applications, where transporting the seeds and media are not an issue, seeds have been held in place by applying a web, net, or blanket over the seeds. This approach is encountered in erosion control.

SUMMARY OF THE INVENTION

It is an object of the present invention to provide a method, composition, and article of manufacture for growing plants such as wildflowers to produce young root masses that are strong enough to harvest, transport, and install in the manner of grass sod.

It is another object of the present invention to provide a method for making and using a composition and an article of manufacture for growing plants that is inexpensive to produce and thus are not as costly to the consumer.

It is yet another object of the present invention to provide a method for making and using a composition and an article of manufacture for growing plants, wherein the root crowns come in full contact with the earth below the composition and article of manufacture.

It is yet another object of the present invention to provide a method for making and using a composition and an article of manufacture for growing plants wherein the composition and article of manufacture do not form an irregular bottom surface and thus completely interface with the earth, so as to increase the survival rate of the seedlings.

It is still another object of the present invention to provide a method for making and using a composition and an article of manufacture for growing plants wherein the composition and article of manufacture do not fall apart during attempts at transporting, storing, and installing.

It is still another object of the present invention to provide a method for making and using a composition and an article of manufacture for growing plants wherein the composition and article of manufacture are not impervious to moisture, such that seed germination is facilitated by adequate drainage.

It is an additional object of the present invention to provide a method for making and using a composition and an article of manufacture for growing plants wherein the composition and article of manufacture are an integral part of the root mass matrix.

It is an additional object of the present invention to provide a method for making and using a composition and an article of manufacture for growing plants wherein the composition and article of manufacture include at least one biodegradable base sheet, so that a subsequent planting does not require removal of the base sheet.

It is yet an additional object of the present invention to provide a method for making and using a composition and an article of manufacture for growing plants wherein the composition and article of manufacture include all matrix structures made of biodegradable material, so that a subsequent planting does not require removal of the matrix.

It is an even further object of the present invention to provide a method for making and using a composition and an article of manufacture for growing plants wherein the composition and article of manufacture need not be formed in a container, such as a plastic tray.

It is an even further object of the present invention to provide a method for making and using a composition and an article of manufacture for growing plants wherein the composition and article of manufacture in a combination that is not homogeneous, so as to make a garden or other pattern.

It is also an object of the present invention to provide the consumer with an improved established sod or other plant matrix, with viable germinated seedlings in an integrated fabric-like form that facilitates long term survivability, erosion control, and the establishment of structured gardens or native plant colonies as nature takes its course.

It is a further object of the present improved invention to provide the foregoing in a manner that is lightweight enough for and average person to move, yet sturdy enough to not fall apart.

It is still yet another of the present improved invention to provide a sod or other plant matrix which is capable of remaining viable after long periods of storage or transportation, and installation under a wide range of conditions—including those employed for installing grass sod.

It is yet a further object of the present improved invention to provide a sod matrix which may be used to commercially propagate native prairie wildflowers, forbs, and grasses indoors or outdoors.

It is yet a further object of the present improved invention to provide a sod matrix which may be used to commercially propagate trees, shrubs, perennials, annuals.

It is yet a further object of the present improved invention to provide a sod or other plant matrix which may be used to commercially propagate structured gardens and landscapes.

It is an additional object to provide a system for commercially producing a landscape or garden design, such as, a corporate logo pattern carried out with flowers and/or foliage, transporting the design from a grower to a user's site, and then installing the landscape or garden design in tact.

These and other features, objectives and advantages of the present improved invention will be readily understood upon consideration of the following detailed description of certain embodiments of the present improved invention and the accompanying drawings.

However, as an overview, the present invention provides a method for making an article of manufacture or composition in a structure for propagation of seedlings, for example, regionally acclimatized native prairie wildflower and native grass sod matrixes. The improvement comprises the use of a three-dimensional structural network which is formed on a sheet of a porous, preferably biodegradable textile material, combined with a growing medium made from compost and other natural and manufactured ingredients, and sown with viable seed. As in the case of native wildflower and grass seed, or any seed upon germination, the roots of the seedlings interlace between a cuspated net and the growing medium forming an integrated sod matrix. In such a fabric-like form, the sod matrix may be grown in economical units for ease of transporting from the growing location to a planting location. Thus, consumers are provided with regionally acclimatized native wildflower and grass plant established sod matrix, and with viable plants. And because the fabric substrate can biodegrade over a short period of time, plant crowns and roots are allowed to knit with the earth, improving long-term survivability of plants and fostering the possibility of creating plant colonies in reclamation and restoration of degraded ecosystems.

More particularly, the present invention includes an improvement in a method of propagating wild flowers in sod mats by steps including: providing a bottom net made of a material that is pervious to moisture, positioning a sheet of a fabric, depositing a layer of planting medium on said fabric, spreading viable wildflower seed over said medium, moistening said medium and said seeds, germinating seeds in the medium, such that roots of seedlings from said seeds intermesh with the fabric forming a sod mat; wherein the bottom net is sufficiently pervious to permit essentially unimpeded root contact with earth below the bottom net. The bottom net is preferably made of a biodegradable plastic that degrades quickly enough that a subsequent planting does not require removal of the bottom net. For example, the bottom net and the sheet of fabric can each be made of a respective biodegradable plastic that degrades quickly enough that a subsequent planting does not require removal of the bottom net.

The present invention also includes an article of manufacture for growing plants in accordance with the method. Ergo, the article includes: a top net; a bottom net made of a material that is pervious to moisture; a mat intermediate the top net and the bottom net; a three-dimensionally located net intermediate the top net and the mat; a growing medium filling interstices defined by the top net and the mat; plant roots in the growing medium; and wherein the bottom net is sufficiently pervious to permit essentially unimpeded root contact with earth below the bottom net. In a preferred embodiment of the invention, the article includes, as the three-dimensional net, a cuspated net, and the plant roots include wildflower plant roots. More particularly, the article is such that the plant roots penetrate the biodegradable bottom net to contact sand below the combination, and especially such that the bottom net does not form an irregular bottom surface to completely interface with earth below the combination.

In a preferred embodiment, the plant roots form in correspondence to plants that are in a heterogeneous pattern. Preferably there is a combination of the articles, that is, including a second article, the second including: a top net; a bottom net made of a material that is pervious to moisture; a mat intermediate the top net and the bottom net; a three-dimensional net intermediate the top net and the mat; a growing medium filling interstices defined by the top net and the mat; plant roots in the growing medium; and wherein the bottom net is sufficiently pervious to permit essentially unimpeded root contact with earth below the bottom net; wherein the articles are installed adjacent each other and include a different kind of plants. Such articles can be produced at a grower location and transported to a site of installation, and wherein the plant roots include roots of prairie wildflowers native to the site of installation, forbs, grass, at least one shrub, at least one tree, perennials, annuals, or any combination thereof—even with spacing for such garden accouterments as a walkway, water garden, bird bath, fountain, furniture, or other commonly encountered garden apparatus or manufacture.

Ideally, though not necessarily, the article is produced at a grower location and is strong enough for transport and installation at a different location, and wherein the plant roots correspond to a pattern from different kinds of plants planted in a design. For example, the article can include a design such as a logo.

DETAILED DESCRIPTION OF THE DRAWINGS

Figure 1:
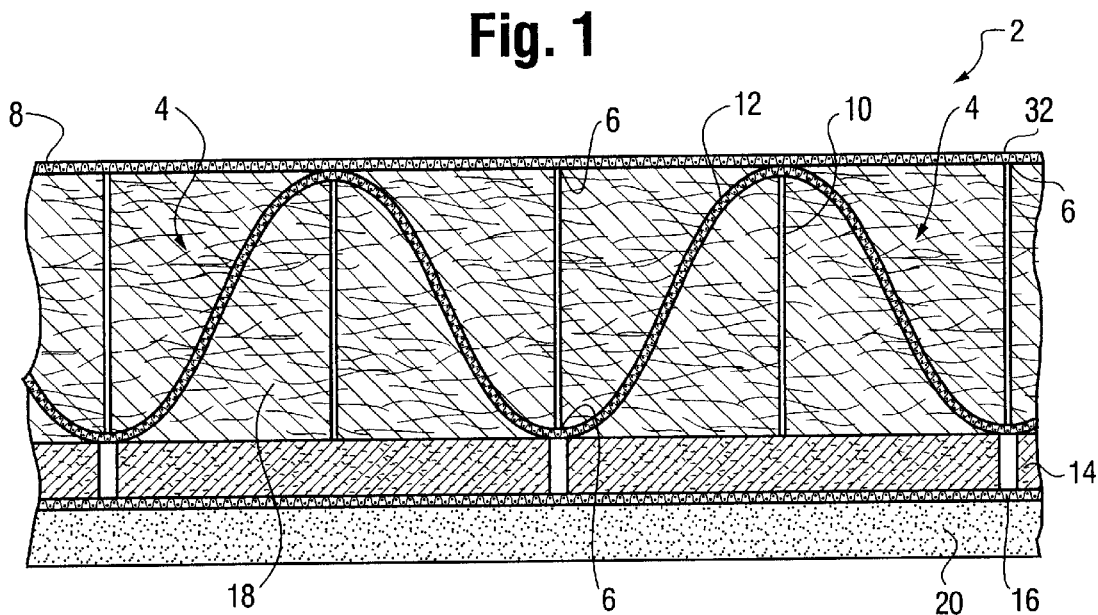
FIG. 1 is a cross-sectional view of a plant sod matrix composition in accordance with the present invention.
Figure 2:
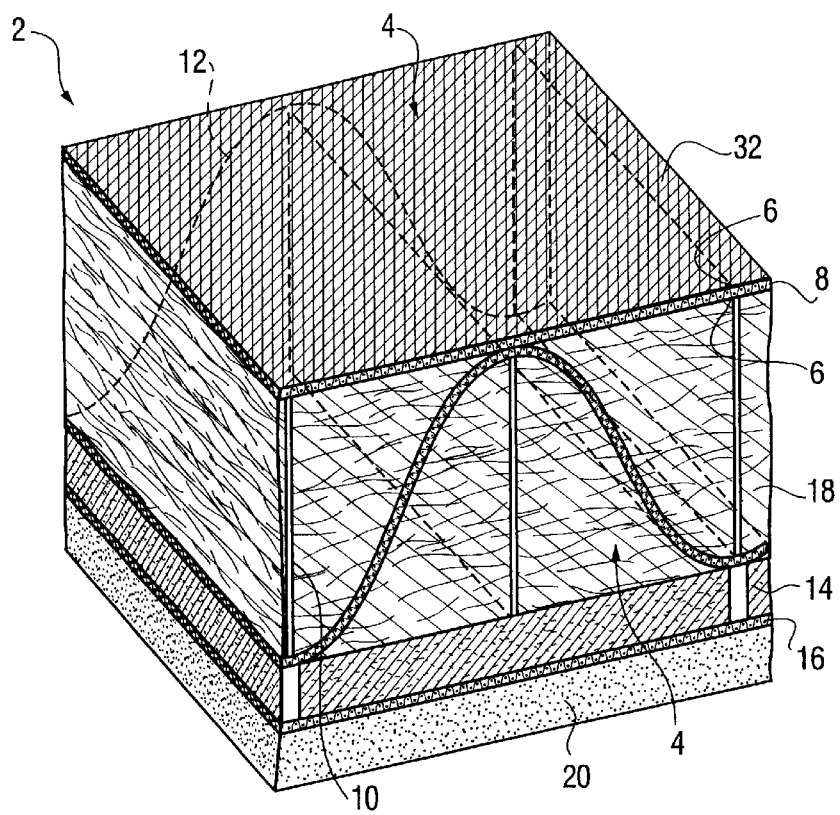
FIG. 2 is a perspective view of the plant sod matrix composition in accordance with the present invention.

Referring to FIG. 1, there is a side-view of a three-dimensional structure 2 defining an area for containing the growing medium, crowns, and roots of seedlings, as subsequently discussed herein. FIG. 2 is a more perspective view, on an enlarged scale, of that composition shown in FIG. 1.

Preferably the structure 2 is a three-dimensional webbing or netting defining spaces 4, each of the spaces prescribed by corners 6. Structure 2 includes a top net 8, a vertical line 10, an three-dimensional net 12, a sheet or mat 14, and a bottom net 16.

Preferably, sheet or mat 14 is made of a fiber matrix, such as a coconut fiber matrix, and is stitch-bonded to a heavy-duty bottom netting, i.e., the bottom net 16. The bottom net 16 can be joined to the three-dimensional net 12, which preferably is a cuspated intermediate sheet. The net 12 is overlaid with a heavy-duty top net 8 and secured by vertical lines 10. A planting or growing medium layer 18 is deposited atop the sheet or mat 14 filling interstices defined by the top net 8 and sheet or mat 14, as traversed by the cuspated three-dimensional net 12. For most wild flower seeds and the like, the planting or growing medium layer 18 can preferably be one inch deep. Generally, the best dimension reflects the needs of the particular seedlings at issue.

A special fabric sheet such as C350 THREE PHASE Reinforcement Mat manufactured by North American Green of Evansville, Ind. is suitable for use as the Structure 2, and its publicly identified patent application is incorporated by reference herein. An improvement is to instead make at least the top net 10, and preferably the entire structure 2 from biodegradable materials, as discussed below.

The structure 2 can be cut or precut to a standard one square yard size or to produce a roll of sod, ideally eighteen inches by seventy-two inches (18" by 72"), which can easily be carried by a person of average weight and height. However, rolls sized like big rolls of sod, as discussed later herein, can alternatively be used—depending on the size of the article of manufacture that is desired.

While the present invention could be carried out using trays sized to accommodate the respective structures 2, but preferably the structures 2 and planting or growing medium layer 18 are placed over a sand bed 20 to assure better drainage of the planting or growing medium layer 18.

For general use, the planting or growing medium layer 18 can be composed of various natural and manufactured synthetic materials such as thirty percent (30%) sphagnum peat moss, thirty percent (30%) compost made from recycled landscape waste, forty percent (40%) blend of sand, vermiculite, or perlite. The compost provides nutritive, natural bio-activators, growth hormones, and natural soil enzymes to stimulate and sustain healthy plant and root development.

Note more particularly that the bottom net 16 can be biodegradable, which facilitates making and using structure 2 as including at least one moisture-permeable bottom net 16 that is preferably reasonably biodegradable, like a biodegradable plastic that degrades quickly enough that a subsequent planting does not require removal of the bottom sheet 14. Preferably, the composition and article of manufacture include structure 2 as made completely of biodegradable plastic material, so that a subsequent planting does not require removal of any portion of.

There is a robust selection of materials that can be employed for the purpose of making structure 2, or any portion thereof (except for sheet or mat 14), each of which is incorporated by reference herein: 5378738 "Biodegradable Plastic"; 5376708 "Biodegradable Plastic Materials, Method of Producing Them, and Their use"; 5250427 "Photoconversion of Gasified Organic Materials into Biologically-degradable Plastics"; 5124371 "Biodegradable Plastic Composition, Biodegradable Plastic Shaped Body and Method of Producing Same"; 5686132 "Glucans Having a Cycle Structure, and Processes for Preparing the Same"; 5676964 "Crosslinked Carboxy Polysaccharides"; 5635550 "Starch-based Composition"; 5569692 "Biodegradable Compositions and Films or Molded Articles Obtained Therefrom"; 5510401 "Starch-based Composition"; 5496895 "Biodegradable Polymers"; 5466461 "Polysaccharide Esters"; 5462982 "Method for the Preparation of Destructured-starch-based Compositions and Compositions Produced Thereby"; 5455361 "Process for Preparing Ketene Acetals"; 5401778 "Biodegradable Plastic Composition and Biodegradable Plastic Shaped Body"; 5360844 "Articles Manufactured with a Composition Containing a Polymer of Unsaturated Hydrocarbon, a C.sub.1–4 alkyl or hydroxy-alkylether of Starch and a Vinyl or Acryl Polymer as a Compatibilizing Agent"; 5360830 "Expanded articles of Biodegradable Plastic Materials"; 5346929 "Biodegradable Plastic and Articles Made Therefrom"; 5334634 "Polymer Compositions for the Production of Articles of Biodegradable Plastics, Material and Methods for their Preparation"; 5288765 "Expanded Articles of Biodegradable Plastics Materials and a Method for Their Production"; 5258430

"Polymer Compositions for the Production of Articles of Biodegradable Plastics Material and Methods of Their Preparation"; 5256711 "Starch-containing Biodegradable Plastic and Method of Producing Same"; 5227415 "Biodegradable Plastic Composition"; 5162392 "Injection Moldable Biodegradable Starch Polymer Composite"; 5122598 "Polysaccharide Esters"; 5087650 "Biodegradable Plastics"; 4957744 "Cross-linked Esters of Hyaluronic Acid. Of these, the patents pertaining to starch compositions are particularly preferable.

In any case, once the net 16 is placed upon the bed of sand 20, the planting or growing medium layer 18 is distributed over the net 16, which preferably is a fabric sheet. The planting or growing medium layer 18 is then thoroughly moistened with water to settle the planting or growing medium layer 18 into the cuspated three-dimensional net 12.

Seeds 22 are then broadcast over the planting or growing medium layer 18. For example, a wildflower and native grass seed mix can be used, but preferably the seeds of the mix are selected and if necessary blended specifically and respectively for each of the seven climatic regions of the United States (Southeast, North Central, Southwest, Texas-Oklahoma, North East, Rocky Mountain, and West). A regional blending is preferable to "a one size fits all" approach, that is often encountered in the prior art. In one embodiment, the seeds 22 are sown preferably so that, at a minimum, the ratio of wildflower and native grass seeds 22 to planting or growing medium layer 18 is four and one-half pounds of seeds per one thousand square feet of planting or growing medium layer 18.

The planting or growing medium layer 18 is re-moistened, preferably with a fine mist of water and kept in that condition until germination of the seeds 22. A slow release fertilizer such as Osmocote 14-14-14 manufactured by Sierra Chemical Company or a very dilute solution of a liquid fertilizer concentrate can be injected into the watering system that supplies water to the seeds 22. The fertilizer should be applied to the seeds 22 and the planting or growing medium layer 18 so that at a minimum, the ratio of fertilizer applied is one-half to one-third the recommended amount suggested by the fertilizer manufacturer for plant use. Application of the fertilizer should begin between the third and fourth week after seeds 22 have germinated. A plant growth stimulant, such as D-lactic acid, plant growth hormone, vitamins, auxins, or the like, can also be used. The composition and article of manufacture of the present invention are not impervious to moisture, such that seed germination is facilitated by adequate drainage.

Figure 3:
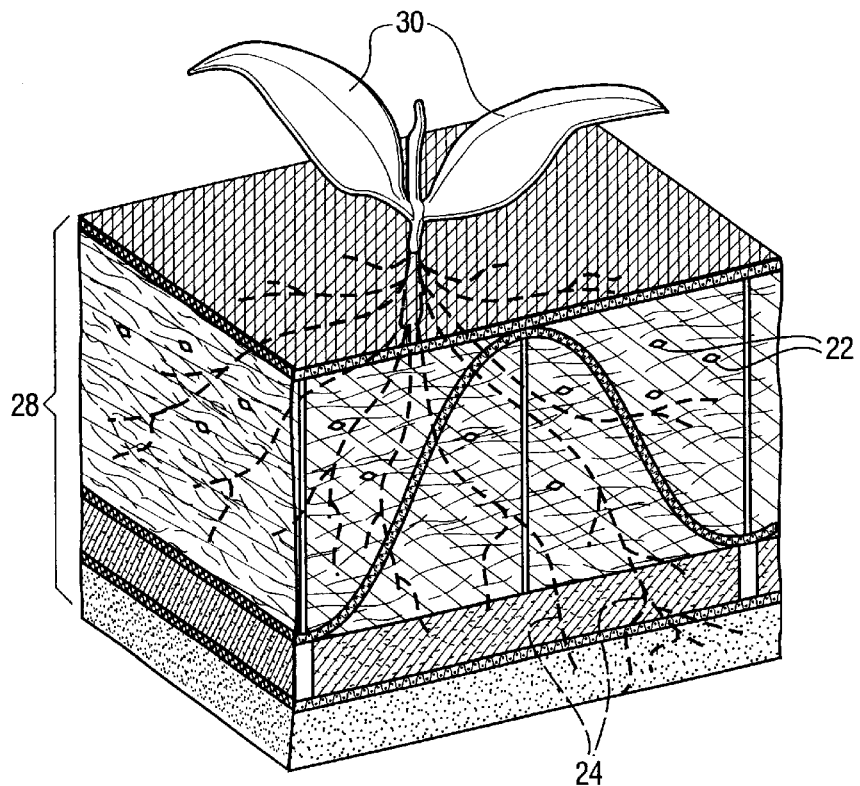
FIG. 3 is an enlarged, perspective view of the plant sod matrix, represented as a prairie wildflower sod mix, composition in accordance with the present invention.

Seed growth should continue for at least eight to twelve weeks, in order for the seeds 22 to grow and produce a substantial root mass generally designated 24 in FIG. 3. Cultivation should take place in an temperate environment, such as a greenhouse or coldframe, so that the temperature remains between sixty and sixty-five degrees Fahrenheit (60°–65° F.). The root mass 24 initially interlaces through the top net 8 above the slowly decomposing layer of coconut fiber of sheet or mat 14 so that ultimately a crown 26 forms in the planting or growing medium layer 18, so as to form a structurally solid sod matrix composition 28 shown in FIG. 3. Preferably only the leaves 30 extend above the matrix 28, and the root crowns 26 come in full contact with earth below the composition and article of manufacture of FIG. 3. Said another way, structure 2 defines an area for containing the planting or growing medium 18, crowns 26, and root mass 24 of seedling plants 30, except that in some embodiments, a portion of the root mass 24 extends into the sand 20.

Thus, the present invention provides a method for making and using a composition and an article of manufacture for growing plants wherein the composition and article of manufacture are an integral part of the root mass matrix. The result is viable, germinated seedlings in an integrated fabric-like form that facilitates long term survivability, erosion control, and the establishment of structured gardens or native plant colonies as nature takes its course. The fabric-like form can be made without trays, and sized small enough so that the matrix composition 28 is lightweight enough for and average person to move, yet sturdy enough to not fall apart. Additionally, the use of a sand bed 20 permits the matrix composition 28 to be formed indoors or outdoors. Preferably there is at least one biodegradable component of structure 2 (beyond the sheet or mat 14, and preferably the bottom net 16), and generally better still is to have all of structure 2 made of biodegradable material, so that a subsequent planting does not require removal of the matrix.

After cultivation of the root mass 24, such as that for the wildflower sod matrix, composition of FIG. 3 is placed in an environment where the minimum temperature is gradually reduced to between thirty and thirty-five degrees Fahrenheit (30°–35° F.) to induce dormancy of the plants for refrigerated storage. Prior to planting the composition of FIG. 3, a gradual exposure to the outside elements, which may take place over a period of two to three weeks, a process known in the horticulture industry as "hardening-off", is necessary to acclimate each seedling plant 30 to the outside environment. Next, the composition and article of manufacture of any one of FIGS. 1–3 (and 4–7, as is subsequently discussed) is harvested by removal from the sand, transported, and installed at a different site, in the manner of installing grass sod, as discussed above.

In the installing, the composition and article of manufacture do not form an irregular bottom surface and thus completely interface with the earth, so as to increase the survival rate of the seedling plants 30. The composition and article of manufacture do not fall apart during the transporting, storing, and installing.

Referring to FIG. 3, another embodiment of the present improved invention, suitable for outdoor propagation, is suggested by dashed lines and arrows. While the composition of FIG. 3 can be pre-cut to the size of a standard roll of turf sod (18" by 72") eighteen inches by seventy-two inches, the equivalent of one square yard, the composition can alternatively be a single sheet blanket of six feet-six inches wide by twenty-five feet long similar to standard "Big Rolls" of turf sod used to cover large areas quickly.

To produce such larger articles, say, for prairie wildflower and native grass seeds, the operations discussed above are carried out as disclosed previously. Additionally, a row cover 32 may be placed atop the planting or growing medium layer 18 to prevent erosion and provide protection from the wind and strong sunlight. The row cover 32 can be made of a sheet of light biodegradable fiber or spun bond polyester, such as Reemaye manufactured by E. I. DuPont de Nemours of Wilmington Del. or an equivalent similar product. The light row cover 32 also contributes to weed control and aids in retaining moisture and frost protection, in accordance with commonly accepted agricultural and horticultural practice.

Seed germination occurs between one and three weeks after sowing. Seeds 22 should be watered evenly and regularly so as to encourage growth. Cultivation of seeds 22 should continue for six to eighteen weeks, contingent upon seedling plant 30 requirements, climate, and the time of the year in which cultivation occurs, so as to permit production of a substantial root mass 24. The root mass 24 intermingles with the cuspated three-dimensional net 12 and planting or growing medium layer 18 so as to form a structural solid wildflower sod matrix composition 28 at a grower location. Thereafter, the solid structural matrix composition 28 can be removed from the sand 22 by rolling and then either transported to a planting site at a user location, or placed in refrigerated storage to be transported later. The planting can be carried out in the manner of planting sod, which is discussed above.

Accordingly, the present invention provides a method, composition, and article of manufacture for growing plants such as wildflowers to produce young root masses that are strong enough to harvest, transport, and install in the manner of grass sod. Further, as particularly contrasted with local planting, the present invention to provides for growing plants that is inexpensive to produce and thus are not as costly to the consumer. In this regard, note that the sheets of cuspated fabric net 18 may be laid out in adjacent rows so as to allow clear access to the sod matrix composition 28 for easier propagation and harvesting purposes.

It should further be noted that while the present improved invention is suitable for the propagation of prairie wildflowers and native grasses, the propagation technique disclosed herein is equally applicable to domesticated perennial and annual plants, bushes, shrubs, crops—especially ginseng—and even trees. (For crops such as ginseng, it is best to not use a biodegradable material for structure 2, but to instead replace the entire composition after harvesting.) Also matrix compositions 28 can be combined on a large scale, for example, to restore a prairie with once-native plants or to reforest an area where there is severe erosion.

The method for making and using a composition and an article of manufacture for growing plants, in accordance with the present invention, need not have a plant pattern that is homogeneous, so as to make a garden or other pattern. One approach is to have large scale matrix compositions 28, each of which is homogeneous, but when installed in a combination, collectively have a non-homogeneous plant pattern, thereby producing a garden at the grower location, for subsequent transporting and installing, to produce an entire non-homogeneous garden. Another approach is to have the non-homogeneity in the actual matrix compositions 28 themselves, say, by use of stencils to control seed broadcasting. Such a garden may include a formal treatment of beds; a mixed perennial border; space for installing a walkway or other garden accouterments, ornaments, and furniture; substantial background plants; well-placed groups of plants; varied edging; and space for larger plants, such as trees, as illustrated in FIG. 4 and FIG. 5.

Figure 4:
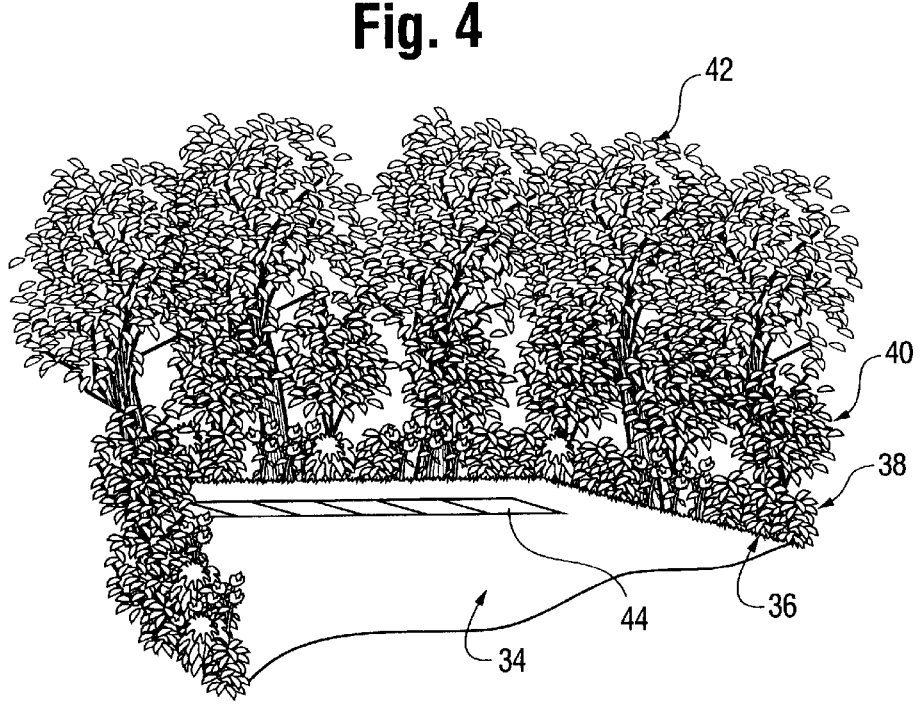
FIG. 4 is a perspective view of a landscaped garden constructed with the plant sod matrix composition in accordance with the present invention.
Figure 5:
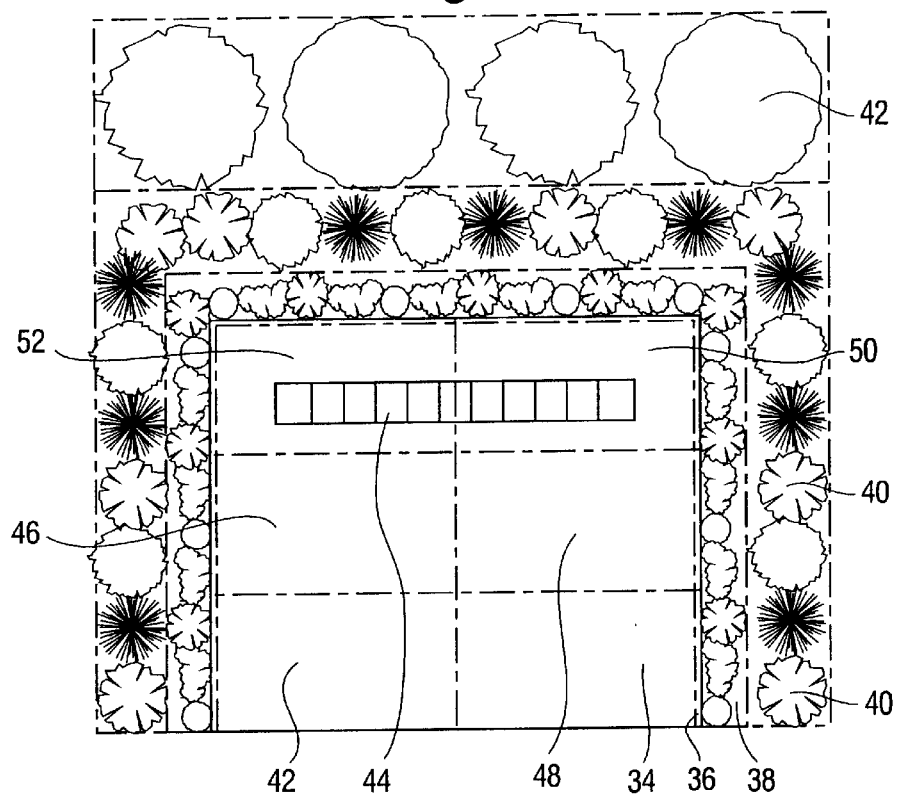
FIG. 5 is a plan for the landscaped garden constructed in accordance with the present invention, as illustrated in FIG. 4.

FIG. 4 illustrates a perspective of a formal garden, complete with a lawn 34, edging 36, layers of flowering or otherwise interesting plants 38, bushes and shrubs 40, trees 42, and even a walkway 44. FIG. 5 illustrates how the garden of FIG. 4 can be laid out in pieces 42–52, i.e., different matrix compositions 28. The matrix compositions 28 can be located to provide room for separately planted large plants, such as the trees 42. However, it is possible to include some bushes and shrubs 40, or even young trees 42, in a matrix composition 28. To minimize cost, one or more stencils can be used to ensure that no seeds 22 fall where the walkway 44 is to be applied or be otherwise wasteful. Accordingly, by the present invention, an entire garden can be planned, structured, and manufactured at a grower's location, transported, and then installed according to plan at a user's location.

Accordingly, the present invention may be used to commercially propagate native prairie wildflowers, forbs, grasses, trees, shrubs, perennials, annuals, and crops, indoors or outdoors, in a matrix composition 28. The lay out of the matrix composition 28 can be suitable for small scale products, like a design (as is subsequently discussed), or a large scale reconstruction of a prairie. The lay out can also be heterogeneous from one matrix composition 28 to another, or can configured to commercially propagate structured gardens and landscapes for transporting to an on site installation.

Figure 6:
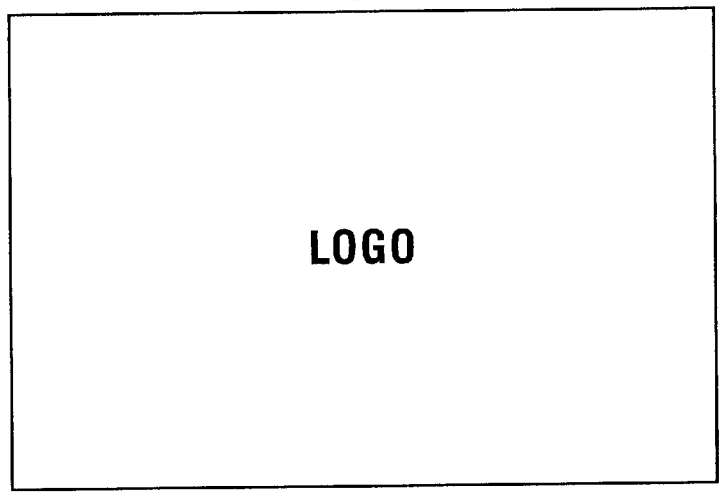
FIG. 6 is an illustration of a design, here represented by a corporate logo, embodied in a plant sod matrix composition as a tangible medium of expression. Illustrating an application of the present invention to commercially propagating a structured landscape.

Of course, such large scale undertakings are not the only application for the present invention. As illustrated in FIG. 6, it is possible to use stencils or other such approaches to selectively create a seed pattern to construct a design such as a corporate logo or other such work in the matrix composition 28 as a tangible medium of expression. This is particularly advantageous for growing in a warm environment, transporting, and then timely installing the logo on site in one quick and convenient installation. For such embodiments, adding a slow-release fertilizer is most desirable. Like other embodiments of the present invention, this approach provides a sod or other plant matrix which is capable of remaining viable after long periods of storage or transportation, and installation under a wide range of conditions—including those employed for installing grass sod.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

I claim:

1. A method of propagating wild flowers in a sod mat by steps including: at a grower location, providing a bottom net made of a material that is pervious to moisture, positioning a sheet of a fabric above the net, depositing a layer of soil on said fabric, spreading viable wildflower seed over said soil, moistening said soil and said seeds, germinating seeds in the soil, such that roots of seedlings from said seeds intermesh with the fabric forming a sod mat, wherein the bottom net is sufficiently previous to permit essentially unimpeded root contact with earth below the bottom net; transporting the sod mat to a user's garden site; and planting the sod mat at the user's garden site.

2. The improvement of claim 1, wherein the bottom net is made of a biodegradable plastic that degrades quickly enough that a subsequent planting does not require removal of the bottom net.

3. An article produced by the method of claim 2.

4. The improvement of claim 1, wherein the bottom net and the sheet of fabric are each made of a respective biodegradable plastic that degrades quickly enough that a subsequent planting does not require removal of the bottom net.

5. An article produced by the method of claim 4.

6. An article produced by the method of claim 1.

7. A garden article of manufacture, the article including:
   a top net;
   a bottom net made of a biodegradable material that is pervious to moisture;
   a mat intermediate the top net and the bottom net;
   a three-dimensionally located net intermediate the top net and the mat;
   a growing medium interstices defined by the top net and the mat;

plant roots in the growing medium; and wherein
the bottom net is sufficiently pervious to permit essentially unimpeded root contact with earth below the bottom net.

8. The article of claim 7, wherein the plant roots correspond to plants in a heterogeneous pattern design.

9. The article of claim 7, wherein the plant roots penetrate the biodegradable bottom net to contact sand below the combination; and wherein the plants are different kinds of the plants planted in a design.

10. The article of claim 7, wherein the bottom net does not form an irregular bottom surface to completely interface with earth below the combination.

11. The article of claim 7, wherein the plant roots correspond to plants in a heterogeneous pattern.

12. The article of claim 10, wherein the design is a logo.

13. The article of claim 7, further including a second article, the second including:
a top net;
a bottom net made of a material that is pervious to moisture;
a mat intermediate the top net and the bottom net;
a three-dimensional net intermediate the top net and the mat;
a growing medium filling interstices defined by the top net and the mat;
plant roots in the growing medium; and wherein
the bottom net is sufficiently pervious to permit essentially unimpeded root contact with earth below the bottom net; wherein
the articles are installed adjacent each other and include a different kind of plants planted in a design encompassing the mats.

14. A method for making a garden, the method including the steps of:
providing a first article including:
a top net;
a bottom net made of a material that is pervious to moisture;
a mat intermediate the top net and the bottom net;
a three-dimensionally located net intermediate the top net and the mat;
a growing medium in interstices defined by the top net and the mat;
plant roots in the growing medium; and wherein
the bottom net is sufficiently pervious to permit essentially unimpeded root contact with earth below the bottom net; and
providing a second article including:
a second top net;
a second bottom net made of a material that is pervious to moisture;
a second mat intermediate the second top net and the second bottom net;
a second three-dimensionally located net intermediate the second top net and the second mat;
a growing medium in second interstices defined by the second top net and the second mat;
a second set of plant roots in the growing medium; and wherein
the second bottom net is sufficiently pervious to permit essentially unimpeded root contact with earth below the second bottom net; and
installing the first article adjacent to the second article to form a garden, wherein the plants are different kinds of the plants planted in a design encompassing the mats.

15. The method of claim 14, further including the steps of producing at least one of said articles at a grower location and transporting said at least one of said articles to said location remote from where said at least one of said articles is produced, and wherein the plant roots include roots of prairie wildflowers native to said location remote from where said at least one of said articles is produced.

16. The method of claim 14, further including the steps of producing at least one of said articles at a grower location and transporting said at least one of said articles to said location remote from where said at least one of said articles is produced, and wherein the plant roots include forbs.

17. The method of claim 14, further including the steps of producing at least one of said articles at a grower location and transporting said at least one of said articles to said location remote from where said at least one of said articles is produced, and wherein the plant roots include roots of grass.

18. The method of claim 14, further including the steps of producing at least one of said articles at a grower location and transporting said at least one of said articles to said location remote from where said at least one of said articles is produced, and wherein the plant roots include roots of at least one shrub.

19. The method of claim 14, further including the steps of producing at least one of said articles at a grower location and transporting said at least one of said articles to said location remote from where said at least one of said articles is produced, and wherein the plant roots include roots of at least one tree.

20. The method of claim 14, further including the steps of producing at least one of said articles at a grower location and transporting said at least one of said articles to said location remote from where said at least one of said articles is produced, and wherein the plant roots include roots of perennials.

21. The method of claim 14, further including the steps of producing at least one of said articles at a grower location and transporting said at least one of said articles to said location remote from where said at least one of said articles is produced, and wherein the plant roots include roots of annuals.

22. The method of claim 14, further including the steps of producing at least one of said articles at a grower location and strong enough for transport and installation at a different location, and wherein the plant roots correspond to a pattern from different kinds of plants planted in a design.

23. An article of manufacture for growing plants, the article including:
a first article including:
a first top net;
a first bottom net made of a material that is pervious to moisture;
a first mat intermediate the first top net and the first bottom net;
a first three-dimensionally located net intermediate the first top net and the first mat;
a growing medium filling first interstices defined by the first top net and the first mat;
a first set of plant roots in the growing medium; and wherein
the first bottom net is sufficiently pervious to permit essentially unimpeded root contact with earth below the first bottom net; and
a second article including:
a second top net;
a second bottom net made of a material that is pervious to moisture;

a second mat intermediate the second top net and the second bottom net;

a second three-dimensionally located net intermediate the second top net and the second mat;

a growing medium filling second interstices defined by the second top net and the second mat;

a second set of plant roots in the growing medium; and wherein the second bottom net is sufficiently pervious to permit essentially unimpeded root contact with earth below the second bottom net; wherein:

the first and the second articles are installed adjacent each other at a location remote from where said articles are manufactured to form a garden, respectively forming a heterogeneous pattern formed from the group consisting of wildflowers, forbs, grass, at least one shrub, at least one tree, perennials, annuals, a space for a garden accouterment, or any combination thereof.

24. A combination of articles produced by the process of claim 23.

25. A method for manufacturing a garden, the method including the steps of:

forming a design for plants in a garden, the design carried out on at least a first mat and a second mat;

at at least one grower location, locating plants in a growing medium to implement portions of the design respectively in the mats;

growing the plants in the mats until the roots intermesh;

harvesting the mats;

transporting the mats to a user's garden site; and forming the garden at the user's site by installing one of the mats adjacent to another of the mats to form the garden, wherein the plants are different kinds of the plants located in the design encompassing the mats.

26. The method of any one of claims 23 or 25, wherein the design is carried out with the group consisting of forbs, at least one shrub, at least one tree, annuals, a space for a garden accouterment, and any combination thereof.

* * * * *